United States Patent
Yasuda

(10) Patent No.: US 9,690,302 B2
(45) Date of Patent: Jun. 27, 2017

(54) FLUID RESISTANCE DEVICE

(71) Applicant: HORIBA STEC, Co., Ltd., Kyoto-shi, Kyoto (JP)

(72) Inventor: Tadahiro Yasuda, Kyoto (JP)

(73) Assignee: HORIBA STEC, Co., Ltd., Kyoto-shi, Kyoto (JP)

(*) Notice: Subject to any disclaimer, the term of this patent is extended or adjusted under 35 U.S.C. 154(b) by 289 days.

(21) Appl. No.: 14/326,384

(22) Filed: Jul. 8, 2014

(65) Prior Publication Data

US 2015/0013792 A1    Jan. 15, 2015

(30) Foreign Application Priority Data

Jul. 9, 2013  (JP) .................................. 2013-143823

(51) Int. Cl.
  G05D 7/01    (2006.01)
  G01F 1/42    (2006.01)
  G05D 7/06    (2006.01)
  G01F 1/40    (2006.01)

(52) U.S. Cl.
  CPC ............. G05D 7/0635 (2013.01); G01F 1/40 (2013.01); *Y10T 137/85938* (2015.04)

(58) Field of Classification Search
  CPC .................................................. G05D 7/0635
  USPC ..................................................... 138/41–45
  See application file for complete search history.

(56) References Cited

U.S. PATENT DOCUMENTS

| | | | | |
|---|---|---|---|---|
| 2,236,084 A | * | 3/1941 | Brown | F16L 55/0338 138/43 |
| 3,504,542 A | * | 4/1970 | Blevins | A61B 5/087 600/529 |
| 4,190,207 A | * | 2/1980 | Fienhold | B05B 1/18 138/46 |
| 4,514,095 A | * | 4/1985 | Ehrfeld | B01F 5/0604 138/42 |
| 4,684,254 A | * | 8/1987 | Goudy, Jr. | B01F 5/0604 261/DIG. 80 |
| 5,672,821 A | * | 9/1997 | Suzuki | G01F 1/684 138/42 |
| 5,884,667 A | * | 3/1999 | North | F16L 55/10 138/43 |
| 2007/0131296 A1 | * | 6/2007 | Schinazi | A61M 5/16877 138/43 |

(Continued)

FOREIGN PATENT DOCUMENTS

| | | |
|---|---|---|
| JP | 2007526086 A | 9/2007 |
| JP | 2011257004 A | 12/2011 |
| WO | 2005084310 A2 | 9/2005 |

OTHER PUBLICATIONS

Japanese Patent Office, Office Action Issued in Application No. 2013-143823, Mar. 30, 2017, 3 pages.

*Primary Examiner* — Vishal Pancholi

(74) *Attorney, Agent, or Firm* — Alleman Hall Creasman & Tuttle LLP

(57) ABSTRACT

In order to be able to stably manufacture a fluid resistance device having the same resistance characteristics while preventing fluid such as gas from leaking, a fluid resistance device is provided with a fluid resistance element having a resistance flow passage, a base member and a fixing member for holding the fluid resistance element to be fixed between the base member and the fixing member, and a thin plate-shaped seal member interposed between the fixing member and the fluid resistance element.

3 Claims, 5 Drawing Sheets

(56) References Cited

U.S. PATENT DOCUMENTS

2011/0192483 A1* 8/2011 Diaz .................... E03C 1/08
138/42

* cited by examiner

FLUID RESISTANCE DEVICE

TECHNICAL FIELD

The present invention relates to a fluid resistance device for use in, for example, a flow control device for controlling a flow rate of fluid or a flow rate measuring device for measuring a flow rate of fluid.

BACKGROUND ART

A fluid resistance device implies a device having a flow passage (also referred to as "resistance flow passage" hereinafter) acting as a resistance when fluid flows therein and a flow rate of the fluid can be measured based on pressures in an upstream side and a downstream side thereof when the fluid is directed to flow through this fluid resistance device.

For example, in the case of a flow control device for controlling a flow rate of material gas used for manufacturing a semiconductor, the fluid resistance device for use therein is required to have a very fine accuracy in controlling the flow rate, and a resistance flow passage is required to have a thickness of several tens of microns in some cases.

Therefore, for example, in Patent Literature 1, there is disclosed a configuration such that upper and lower sides of an annular slit plate having a thickness of several tens of microns which is radially formed with a plurality of slits are covered with circular cover plates so that each of the slit portions serves as a resistance flow passage. In this configuration, the slit plate together with the cover plates is held and fixed between upper and lower fixing plates via seal members such as O-rings from further upper and lower sides of the cover plates.

However, when the fixing plates hold the cover plate therebetween, stresses are concentrated at a contact portion between the O-ring and the cover plate and there occurs a slight deflection in the cover plate having a thickness of several tens of microns. Thus, the resistance characteristics of the fluid resistance device are changed by a slight error of an applied power adjustment when holding the cover plate between the fixing plates. Therefore, it becomes difficult to stably manufacture the fluid resistance device having uniform resistance characteristics. In some cases, there may be also a problem that the cover plate is largely deflected and the resistance flow passage would be completely crushed and the fluid would not be able to flow in the resistance flow passage.

CITATION LIST

Patent Literature

Patent Literature 1: JPA2011-257004

SUMMARY OF INVENTION

Technical Problem

Therefore, the present invention has been made in consideration of solving the problem and its essential object is to be able to stably manufacture a fluid resistance device having the same resistance characteristics while preventing fluid such as gas from leaking.

Solution to Problem

That is, a fluid resistance device according to the present invention has a specific feature of including a fluid resistance element having a resistance flow passage, a first member and a second member for holding the fluid resistance element to be fixed between the first and second members, and a thin plate-shaped seal member interposed between the first member and the fluid resistance element.

With this configuration, the thin plate-shaped seal member seals between the fluid resistance element and the first member to be able to prevent the fluid from leaking from a space between them. Further, since a contact area between the thin plate-shaped seal member and the fluid resistance element becomes wide, it is possible to disperse a stress applied to the fluid resistance element from the thin plate-shaped seal member. Thus, the fluid resistance devices having the same resistance characteristics can be manufactured very stably without being affected by an error of the stress, and therefore an instrumental error can be reduced.

In the above configuration, it is preferable that the fluid resistance device further includes a pressing member applying a force to the first member for fixing the fluid resistance element between the first member and the second member and that a second seal member which is deformable in the thickness direction, such as an O-ring, is interposed between the pressing member and the first member.

With this configuration, when the pressing member applies the force to the first member, since the second seal member such as an O-ring is deformed, the fluid resistance element is unlikely to collapse, and therefore the fluid resistance device having the same resistance characteristics can be manufactured more stably.

As an embodiment aspect having a particularly remarkable effect of the present invention, it is preferable that the thin plate-shaped seal member has an annular shape when viewed from the thickness direction and that an outer circumference and an inner circumference of the thin plate-shaped seal member are concentric.

More specifically, it is exemplified that the fluid resistance element is made of Inconel 600 and that the fixing member and the thin plate-shaped seal member are made of SUS 316L.

With this configuration, even in the case where the fluid has a corrosive property, it is possible to prevent the fluid resistance element and each of the members from corroding.

As a specific embodiment aspect of the fluid resistance element, it is exemplified that the fluid resistance element includes a slit plate formed with a slit passing through in a thickness direction, and a slit cover plate provided on each side of the slit plate in the thickness direction to cover a partial portion of the slit.

As a specific embodiment aspect of each plate member, it is exemplified that the slit plate has an annular shape including a first though hole passing through a center portion thereof in a thickness direction, and a plurality of the slits are radially formed outward from the center portion, the slit cover plate has an annular shape formed with a second through hole passing through a center portion thereof in a thickness direction, overlapping the first through hole and at least a part of the slits when viewed in the thickness direction, and the slit plate and the slit cover plate are stacked, thereby providing an internal space formed of the first through hole and the second through hole communicating with each other while respective center axes thereof are aligned, and a resistance flow passage for rendering fluid flowing in the internal space to flow along the slits.

Advantageous Effects of Invention

According to the present invention configured as described above, it is possible to stably manufacture the fluid resistance device having the same resistance characteristics while preventing fluid such as gas from leaking, and therefore an instrumental error can be reduced.

DESCRIPTION OF EMBODIMENTS

A fluid resistance device 10 according to the present invention is intended to be used in a flow control device 100.

The flow control device 100 is used, for example, in a semiconductor manufacturing process and this flow control device 100 is intended to control a mass flow rate when material gas or the like of a semiconductor is directed to flow.

Figure 1:
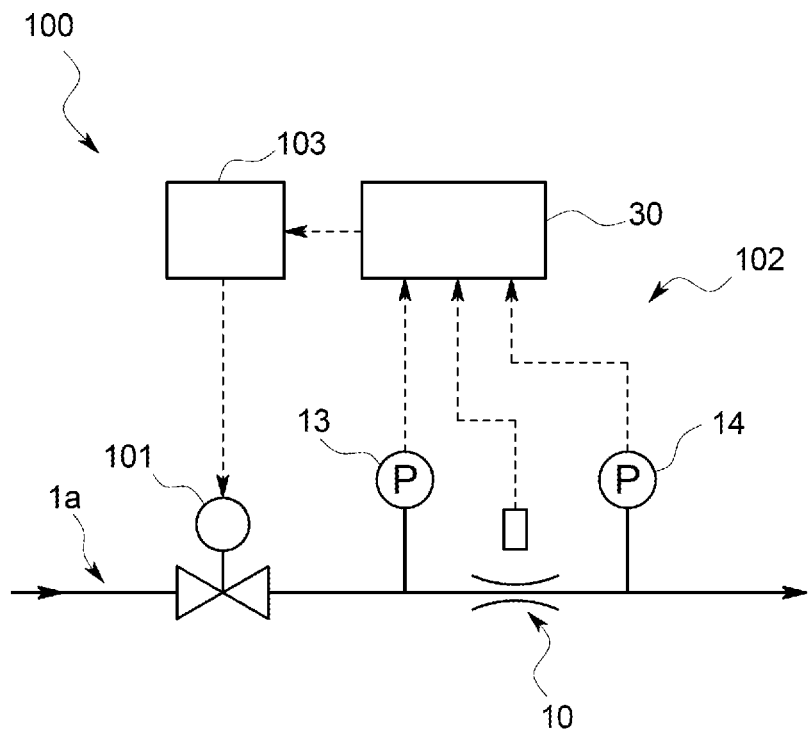
FIG. 1 is a fluid circuit diagram of a fluid control device in one embodiment of the present invention.

Specifically, as shown in FIG. 1, this flow control device 100 includes a flow adjusting valve 101 provided on an internal flow passage 1a, a flow rate measuring part 102 provided in a downstream side of the flow adjusting valve 101 and measuring a mass flow rate of fluid flowing in the internal flow passage 1a, and a control circuit 103 for controlling the flow adjusting valve 101 so that the measurement flow rate measured by the flow rate measuring part 102 becomes a predetermined target flow rate.

The flow rate measuring part 102 is of a differential pressure type and it includes an upstream side pressure sensor 13 provided in an upstream side of the internal flow passage 1a, a downstream side pressure sensor 14 provided in a downstream side of the internal flow passage 1a, the fluid resistance device 10 provided between the upstream side pressure sensor 13 and the downstream side pressure sensor 14 and causing a pressure difference, and a flow rate calculation circuit 30 serving as a flow rate calculating part for calculating a flow rate of the fluid flowing in the internal flow passage 1a based on pressure measurement values measured by the pressure sensors 13 and 14 and a resistance value of the fluid resistance device 10.

In the present embodiment, since the fluid resistance device 10 has a specific feature, it is described in detail below.

Figure 2:
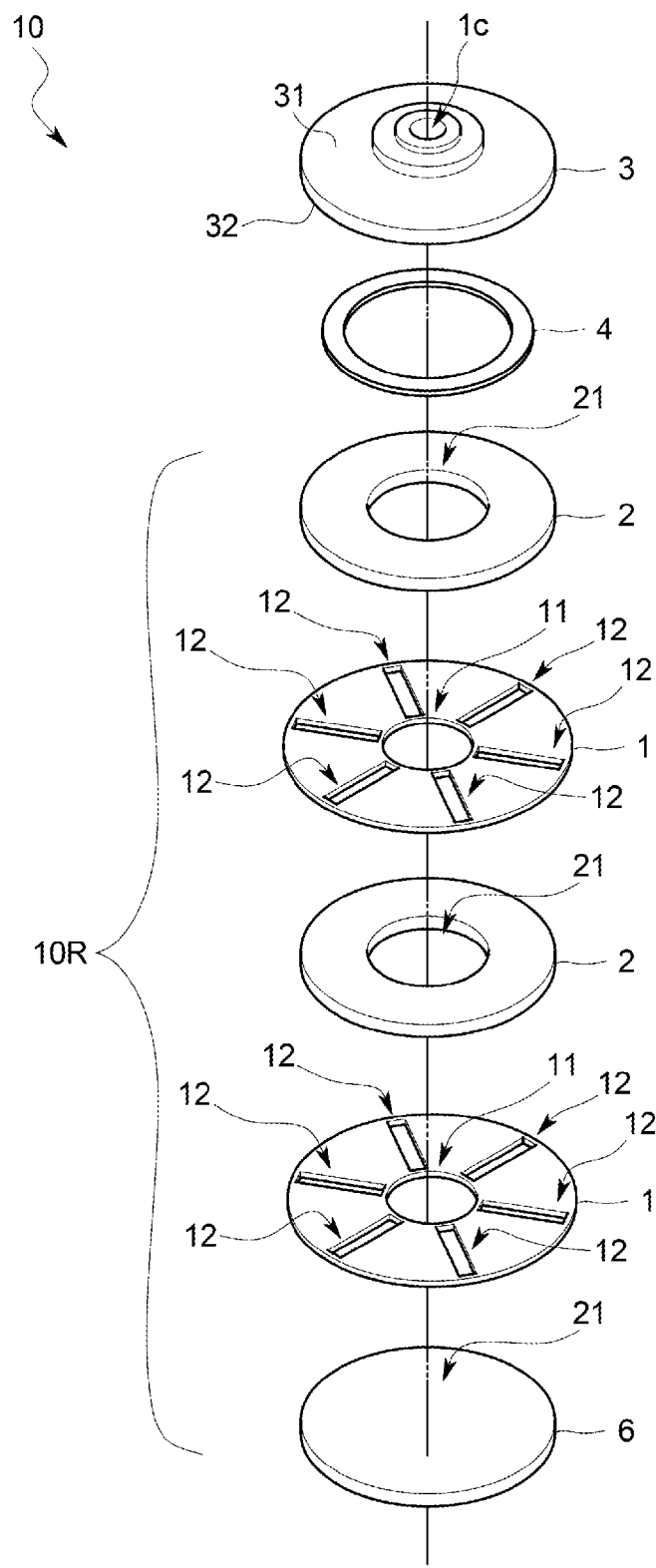
FIG. 2 is an exploded perspective view of a fluid resistance device in the same embodiment.
Figure 3:
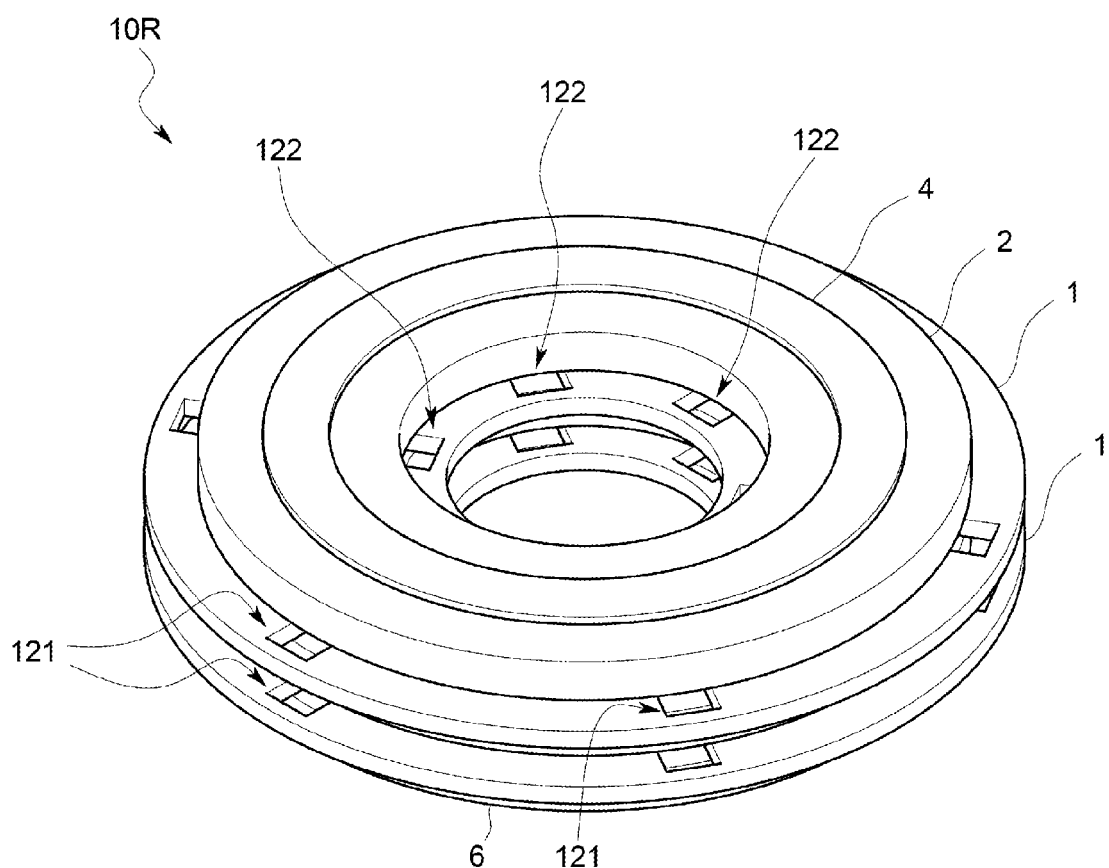
FIG. 3 is an overall perspective view of a fluid resistance element in the same embodiment.
Figure 4:
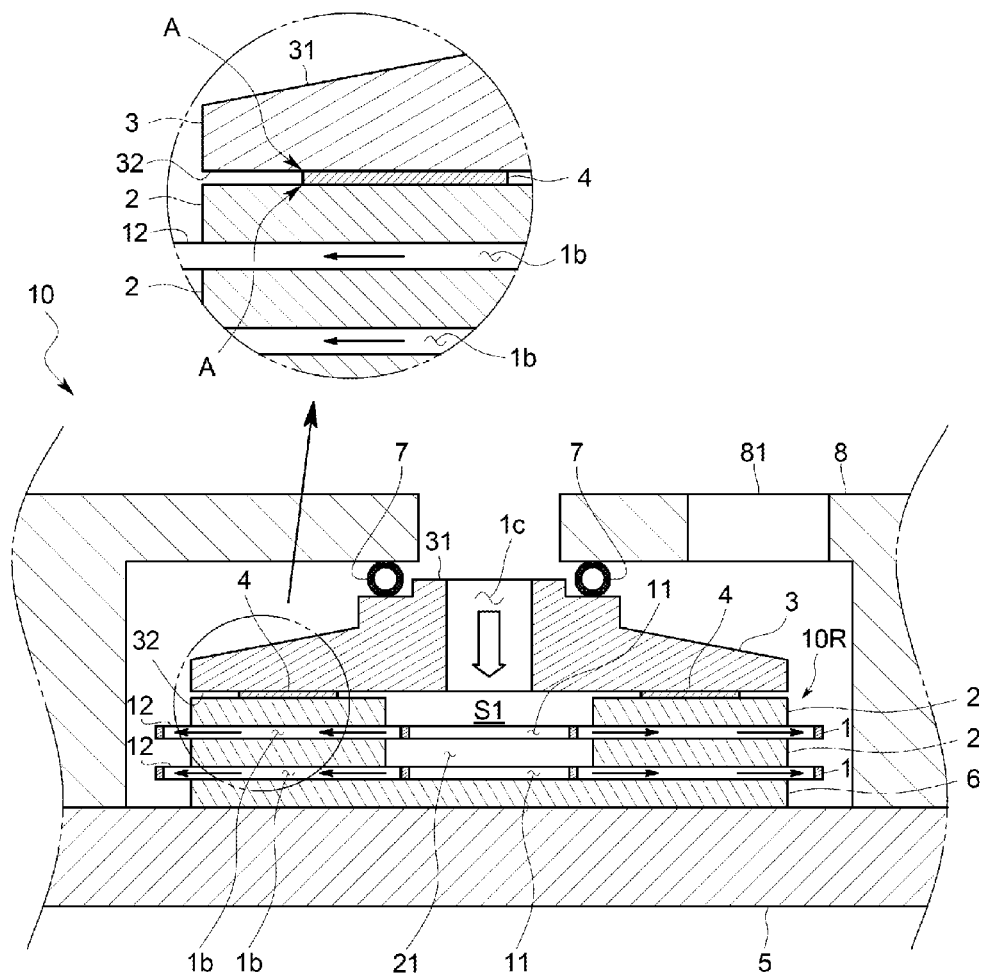
FIG. 4 is a cross sectional view of the fluid resistance device in the same embodiment.

As shown in FIGS. 2 to 4, the fluid resistance device 10 comprises a fluid resistance element 10R having a substantially rotating body shape, a base material 5 on which the fluid resistance element 10R is disposed, a fixing member 3 for holding and fixing the fluid resistance element 10R between the fixing member 3 and the base material 5, and a thin plate-shaped seal member 4 interposed between the fixing member 3 and the fluid resistance element 10R.

It should be noted that the fixing member 3 serves as a first member and the base material 5 serves as a second member in the present embodiment.

The fluid resistance element 10R comprises a slit plate 1, a slit cover plate 2, and a bottom plate 6, and these plate members are separately formed in the present embodiment, but these plate members may be integrally molded to form the fluid resistance element 10R.

The slit plate 1 has a thickness of, for example, 25 μm, having an annular disc shape and made of corrosion-resistant metal such as, for example, Inconel 600.

More specifically, as shown in FIG. 2, the slit plate 1 has a circular shaped first through hole 11 that is formed by passing through a central portion of the disc plate in a thickness direction and a plurality of slits 12 that are formed to radially extend from the central portion. In the present embodiment, although six slits 12 are formed at equal intervals along a circumferential direction, the number of slits is not limited to six and it is not necessary that the intervals thereof are equal.

All of the plurality of slits 12 have the same shape in the present embodiment and each of them has a rectangular shape when viewed from the thickness direction. It should be noted that the shapes of the slits 12 should not be limited to the rectangular shapes but each of them may be, for example, shapes such as an elliptical shape, and all of them may not have the same shape.

The slit cover plate 2 has a thickness of, for example, 50 μm, having an annular disc shape and made of, for example, the same kind of the metal as that of the slit plate 1.

More specifically, as shown in FIG. 2, each of the slit cover plates 2 has a circular shaped second through hole 21 that is formed by passing through a central portion of the disc plate in a thickness direction, having its outer diameter smaller than that of the slit plate 1 and its inner diameter larger than that of the slit plate 1.

When viewed in the thickness direction in a state that the slit plates 1 and the slit cover plates 2 are concentrically stacked as shown in FIGS. 2 and 3, an outer end portion 121 of each of the slits 12 is formed to protrude further outward than that of the slit cover plate 2 and an inner end portion 122 of each of the slits 12 is formed to protrude further inward than that of the second through hole 21, and each of the slit cover plates 2 covers the slits 12 except for both of these outer and inner end portions 121 and 122.

In the present embodiment, as shown in FIG. 4, the slit plates 1 and slit cover plates 2 are alternately stacked on the bottom plate 6 disposed on the base material 5 to thereby form a laminated structure. In this laminated structure, the first through holes 11 and the second through holes 21 communicate to form an internal space S1 and the fluid flowing in the internal flow passage 1a is allowed to flow into the internal space S1. Meanwhile, each of the second through holes 21 and the slits 12 communicate to form resistance flow passages 1b radially extending from the internal space S1, thereby allowing the fluid flowing into the internal space S1 to flow along the slits 12.

Subsequently, the following describes a fixing structure for fixing the fluid resistance element 10R.

As described above, the fluid resistance element 10R having the lamination structure formed of the bottom plate 6, slit plates 1, and slit cover plates 2 is held and fixed between the base material 5 and the fixing member 3.

In the present embodiment, although the base material 5 and the fixing member 3 hold the fluid resistance element 10R in a direction perpendicular to a movement direction of the fluid flowing in the resistance flow passage 1b, it is not always necessary that this holding direction is perpendicular to the movement direction of the fluid.

This fixing member 3 is made of corrosion-resistant metal such as, for example, SUS316L and, as shown in FIGS. 2 and 4, it has a substantially rotating body shape having a communication passage 1c having a diameter smaller than that of the second through hole 21. The communication passage 1c is formed at a central portion of the fixing member 3 to communicate the internal flow passage 1a of the flow control device 100 with the internal space S1. A top surface 31 having one opening of the communication passage 1c has a step formed between the outer peripheral portion and the central portion, and a bottom surface 32 having the other opening of the communication passage 1c is an annular-shaped flat surface having an outer diameter equal to that of the slit cover plate 2. In the step, there is provided a second seal member 7, such as, for example, an O-ring, that is deformable in the thickness direction and deformable more easily than the thin plate-shaped seal member 4 to be described later.

In the present embodiment, a block-shaped pressing member 8 attached to the base material 5 is intended to press the fixing member 3 against the base material 5 via the second seal member 7 to thereby hold the fluid resistance element 10R to be fixed between the fixing member 3 and the base material 5.

Here, the pressing member 8 has an opening portion 81 formed for allowing the fluid to flow out.

In the case where the fluid resistance element 10R is fixed with this configuration and the fluid resistance device 10 is installed on the internal flow passage 1a, the fluid flowing in the internal flow passage 1a flows into the communication passage 1c through the above one opening of the communication passage 1c and then flows to the internal space S1 through the other opening via the communication passage 1c. The fluid introduced to the internal space S1 flows into the radially-formed resistance flow passages 1b from this internal space S1. Then, the fluid flows out from the outer end portions 121 of the slits 12 forming the resistance flow passages 1b and guided to the internal flow passage 1a through the opening portion 81.

Thus, in the present embodiment, in order to prevent the fluid from leaking to the outside through a gap between the slit cover plate 2 positioned at an upper layer of the plate members forming the laminate structure and the fixing member 3 when the fluid is guided to the internal space S1 via the communication passage 1c, the thin plate-shaped seal member 4 is interposed between the slit cover plate 2 and the fixing member 3 to thereby configure to seal the gap therebetween.

This thin plate-shaped seal member 4 is of a flat plate shape having a constant thickness of, for example, 50 μm or less, and it is made of corrosion-resistant metal such as, for example, SUS316L.

More specifically, as shown in FIGS. 2 to 4, the thin plate-shaped seal member 4 has an annular shape having its outer diameter smaller than that of the slit cover plate 2 and its inner diameter larger than that of the slit cover plate 2 and having an outer circumference and an inner circumference thereof concentrically formed.

Thus, particularly as shown in FIG. 4, in a state that the thin plate-shaped seal member 4 is interposed between the slit cover plate 2 and the fixing member 3, it is formed so as to have a sufficiently large contact area in width between the thin plate-shaped seal member 4 and the slit cover plate 2 compared to the thickness of the thin plate-shaped seal member 4.

In the fluid resistance device 10 according to the present embodiment configured as described above, when the bottom plate 6, slit plates 1 and slit cover plates 2 are held between the fixing member 3 and the base material 5, the thin plate-shaped seal member 4 is crushed between the slit cover plate 2 and the fixing member 3. Thus, the gap therebetween can be sealed and the fluid can be thereby prevented from leaking out.

As shown in an enlarged view of FIG. 4, the annular-shaped thin plate-shaped seal member 4 is more closely contacted at outer corner portions A and the sealing function appears to be secured at the outer corner portions A.

Further, in a state that the thin plate-shaped seal member 4 is interposed between the slit cover plate 2 and the fixing member 3, since it is formed so as to have a sufficiently large contact area in width between the thin plate-shaped seal member 4 and the slit cover plate 2 compared to the thickness of the thin plate-shaped seal member 4, it is possible to disperse the stress applied to the slit cover plate 2 from the thin plate-shaped seal member 4. Thus, even in the case where there is an error in the stress applied to the slit cover plate 2 from the thin plate-shaped seal member 4, this stress can be dispersed and a deflection of the slit cover plate 2 can be suppressed. Therefore, it is possible to stably manufacture the fluid resistance device 10 having the same resistance characteristics without being affected by the error and it becomes possible to reduce an instrumental error.

Moreover, since the fluid resistance element 10R, fixing member 3 and thin plate-shaped seal member 4 are made of corrosion-resistant metal such as, for example, Inconel 600 or SUS316L, even in the case where the fluid has a corrosive property, each of these members can be prevented from being corroded.

Since the second seal member 7 which is easily deformable in the thickness direction compared to the thin plate-shaped seal member 4 is interposed between the fixing member 3 and the pressing member 8, when the pressing member 8 presses the fixing member 3, this second seal member 7 is deformed and the fluid resistance element 10R thereby becomes difficult to crush. Therefore, the fluid resistance device 10 having the same resistance characteristics can be manufactured more stably.

It is noted that the present invention should not be limited to the embodiment described above.

Figure 5:
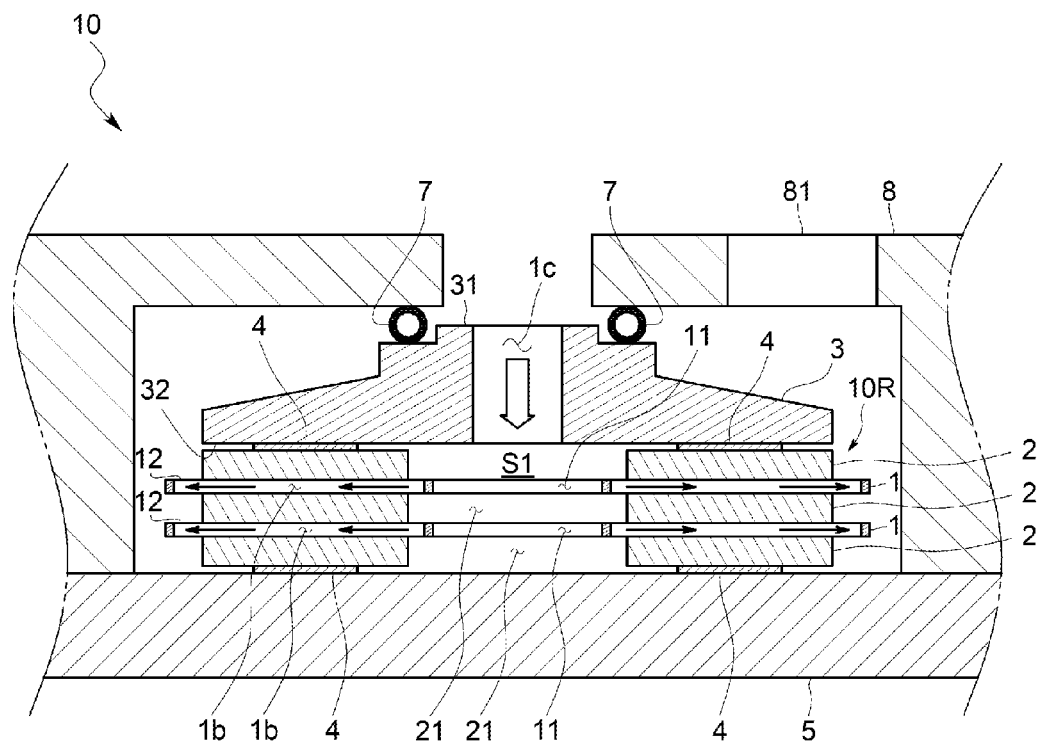
FIG. 5 is a cross sectional view of the fluid resistance device in another embodiment.

For example, although the thin plate-shaped seal member 4 is interposed between the upper slit cover plate 2 positioned at the upper layer of the plate members forming the laminate structure and the fixing member 3 in the present embodiment, in the case where the slit plates 1 and the slit cover plates 2 are stacked without disposing the bottom plate 6 on the base material 5 as shown in FIG. 5, the thin plate-shaped seal member 4 may be interposed not only between the upper layered slit cover plate 2 and the fixing member 3 but also between the lower layered slit cover plate 2 and the base material 5 to thereby further improve the airtightness.

Further, although a plurality of slit plates 1 have the same shape in the present embodiment, these slit plates 1 may have different shapes.

In specific, the slit plates 1 having the slits 12 of different shapes or different numbers of slits 12 or the slit plates 1 of different thicknesses may be stacked. With this configuration, the resistance characteristics of the fluid resistance element 10R may be easily changed only by appropriately combining the slit plates 1 to be stacked.

Furthermore, although the thin plate-shaped seal member 4 has an annular shape in the present embodiment, the thin plate-shaped seal member 4 may be formed to have other shapes, for example, the outer circumference and inner circumference may have rectangular shapes.

In addition, although the slit plate 1 and slit cover plate 2 are annular-shaped in the present embodiment, these plates may be formed to have rectangular shapes.

Moreover, although the fixing member 3 is used as the first member and the base material 5 is used as the second member in the present embodiment, the base material 5 may be used as the first member and the fixing member 3 may be used as the second member and it may be also configured that the pressing member 8 presses the base material 5 against the fixing member 3. In this case, it is sufficient that the second seal member 7 is merely interposed between the pressing member 8 and the base material 5.

A sonic nozzle may be used as the fluid resistance element 10R.

As the flow control device 100, other devices such as a flow meter (flow rate measuring instrument) may be used without the flow adjusting valve 101.

In addition, the present invention should not be limited to the above embodiments shown in the drawings, and various modifications are possible within the scope unless departing from the intended spirit thereof.

DESCRIPTION OF REFERENCE CHARACTERS

10 . . . Fluid resistance device
10R . . . Fluid resistance element
1 . . . Slit plate
2 . . . Slit cover plate
3 . . . Fixing member
4 . . . Thin plate-shaped seal member
12 . . . Slit
S1 . . . Internal space
1b . . . Resistance flow passage

The invention claimed is:

1. A fluid resistance device comprising:
   a fluid resistance element having a resistance flow passage;
   a first member and a second member configured to hold the fluid resistance element to be fixed between the first and second members;
   a pressing member configured to press the first member against the second member;
   a thin plate-shaped seal member interposed between the first member and the fluid resistance element;
   an internal space into which a fluid flows is formed inside of the fluid resistance element; and
   an external space into which the fluid flows is formed adjacent to an exterior radial surface of the fluid resistance element and adjacent to a surrounding surface which surrounds the fluid resistance element, wherein
   the fluid resistance element comprises:
      a slit plate formed with a slit passing through in a thickness direction; and
      a slit cover plate provided on each side of the slit plate in the thickness direction to cover a partial portion of the slit, and
   a first end part of the slit is communicated with the internal space, and a second end part of the slit is communicated with the external space.

2. The fluid resistance device according to claim 1 further comprising a pressing member applying a force to the first member configured to fix the fluid resistance element between the first member and the second member, wherein
   a second seal member which is deformable in the thickness direction is interposed between the pressing member and the first member.

3. The fluid resistance device according to claim 1, wherein the slit plate has an annular shape including a first through hole passing through a center portion thereof in the thickness direction, and a plurality of the slits are radially formed outward from the center portion,
   the slit cover plate has an annular shape formed with a second through hole passing through a center portion thereof in the thickness direction, overlapping the first through hole and at least a part of the slits when viewed in the thickness direction, and
   the slit plate and the slit cover plate are stacked, thereby providing:
      the internal space formed of the first through hole and the second through hole communicating with each other while respective center axes thereof are aligned; and
      a resistance flow passage for rendering fluid flowing in the internal space to flow along the slits.

* * * * *